United States Patent [19]

Rousseau

[11] Patent Number: 4,828,447
[45] Date of Patent: May 9, 1989

[54] TRANSMISSION ASSEMBLY AND METHOD FOR USING THE SAME

[75] Inventor: Claude Rousseau, Neuville-sur-Saone, France

[73] Assignee: Societe Rousseau S.A., Neuville-sur-Saone, France

[21] Appl. No.: 132,322

[22] Filed: Dec. 14, 1987

[30] Foreign Application Priority Data

Dec. 18, 1986 [FR] France .................. 86 18309

[51] Int. Cl.$^4$ .............................................. F16H 7/00
[52] U.S. Cl. ........................................ 474/148; 474/86
[58] Field of Search ............... 474/148, 84, 86, 87, 474/69, 70, 75, 101

[56] References Cited

U.S. PATENT DOCUMENTS 3,319,731 5/1967 Kenkel ............................. 474/86 X
3,837,291 9/1974 Umlor ............................. 474/148 X

FOREIGN PATENT DOCUMENTS 1228908 10/1960 France.
666984 2/1952 United Kingdom.
86/01572 3/1986 World Int. Prop. O..

Primary Examiner—Thuy M. Bui
Attorney, Agent, or Firm—Sandler & Greenblum

[57] ABSTRACT

A transmission assembly is provided for rotating a driver pulley connected to a belt by a driven pulley such that the two pulleys define an action plane. The assembly includes a rotatable output shaft having one end adapted to be connected to the driven pulley and extending in a direction perpendicular to the action plane. The output shaft is mounted on a pivotal axis parallel to the action plane for pivotal movement in a plane perpendicular to the action plane. A rotatable input shaft is provided which is adapted to have a torque applied thereto. Finally, a mechanical coupling is provided for coupling the input shaft to the other end of the output shaft such that the two shafts angularly intersect. As a consequence of this arrangement, the torque applied to the input shaft is resolvable into a couple, one force of which passes through the pivot axis and the other of which passes through the driver pulley for applying tension to the belt.

6 Claims, 3 Drawing Sheets

4,828,447

TRANSMISSION ASSEMBLY AND METHOD FOR USING THE SAME

TECHNICAL FIELD

This invention relates to a transmission assembly and method for using the same, and more particularly to a transmission assembly for rotating a driver pulley connected by a belt to a driven pulley, such assembly being hereinafter referred to as an assembly of the type described.

BACKGROUND ART

In assemblies of the type described, proper operation requires the belt tension to have a value dependent on the load being transmitted in order to prevent slippage and consequent loss of power to the driven pulley. Conventionally, the required belt tension is provided by utilizing an adjustable belt tensioner that engages the belt and creates therein a tension force that effects proper load transfer from the driver to the driven pulley. Because of its engagement with the belt, a conventional belt tensioner causes the belt to wear and is undesirable from this standpoint. Moreover, conventional belt tensioners act only on the drive side of the belt and do not prevent all slippage that may occur.

It is therefore an object of the present invention to provide a new and improved transmission assembly which overcomes or substantially ameliorates the problems described above.

BRIEF DESCRIPTION OF THE INVENTION

A transmission assembly according to the present invention is provided for rotating a driver pulley connected by a belt to a driven pulley such that the two pulleys define an action plane. The assembly comprises a rotatable output shaft having one end adapted to be connected to the driver pulley and extending in a direction perpendicular to the action plane. Mounting means are provided for mounting the output shaft on a pivot axis parallel to the action plane for pivotal movement in a plane perpendicular to the action plane. A rotatable input shaft is adapted to have a torque applied thereto; and coupling means are provided for coupling the input shaft to the other end of the output shaft such that the two shafts angularly intersect.

The torque applied to the rotatable input shaft is resolvable into a couple defined by two equal and opposite forces, one force passing through the pivot axis and the other force passing through the driver pulley, the two forces being separated by a distance L. By selecting the distance L in accordance with the load on the driver pulley, the force acting on the driver pulley will be sufficient to provide the appropriate tension in the belt between the driver and the driven pulley that will transmit the load on the driven pulley without belt slippage.

BRIEF DESCRIPTION OF THE DRAWINGS

Embodiments of the present invention are disclosed in the accompanying drawings wherein.

DETAILED DESCRIPTION

Figure 1:
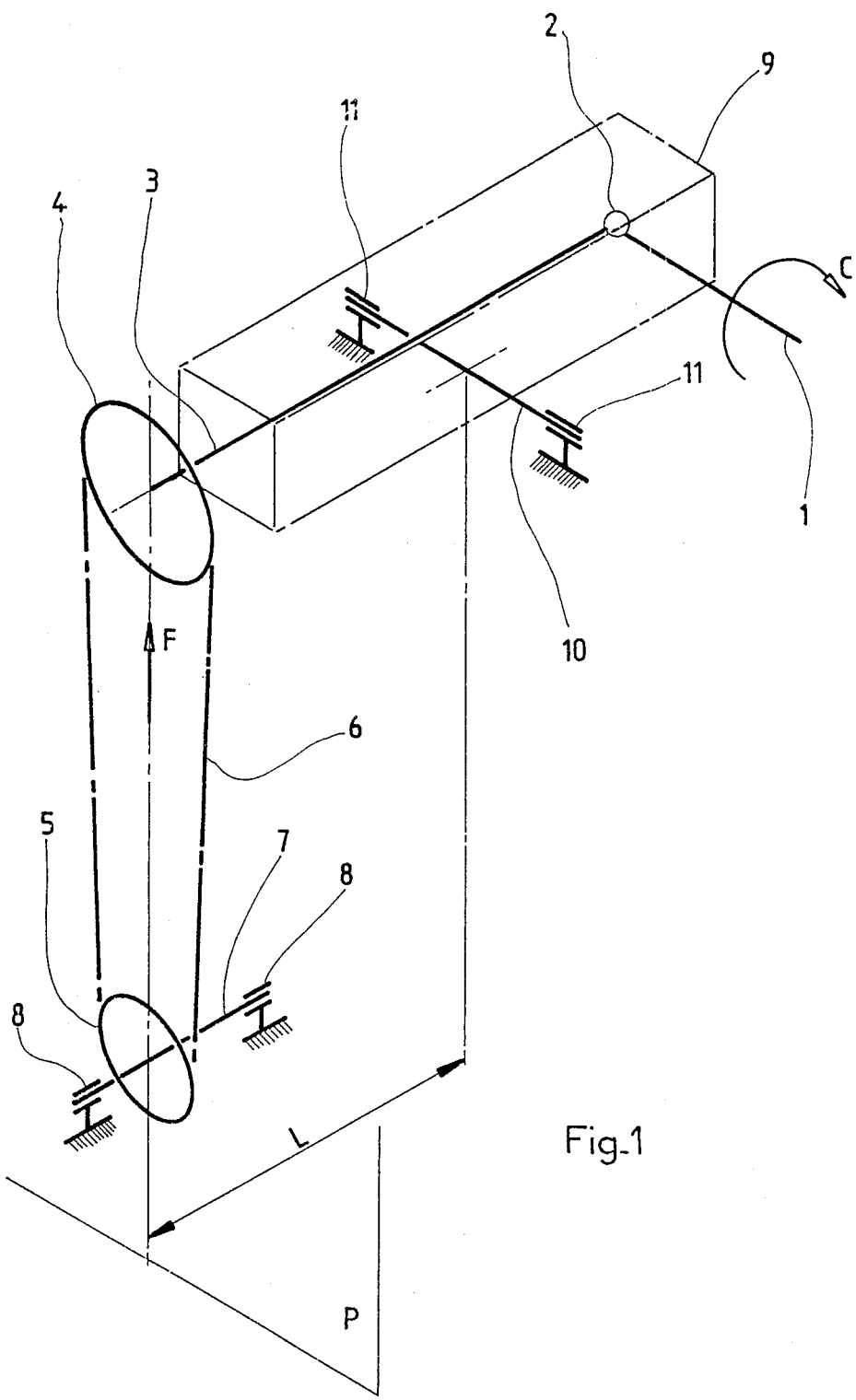
FIG. 1 is a schematic representation of a first embodiment of the present invention wherein the pivot axis of the mounting means of the output shaft is located between the two ends of the output shaft.

Referring now to FIG. 1, reference numeral 1 designates an input shaft adapted to be connected to a motor which produces a torque C to the input shaft. This torque is applied through appropriate means 2, such as a bevel gear arrangement, to output shaft 3 rotatably mounted in transmission assembly 9. Preferably, but not necessarily, the axis of input shaft 1 is perpendicular to the axis of output shaft 3.

Assembly 9 is mounted by shaft 10 for pivotal movement about the axis of shaft 10 which is journalled in bearings 11, 11. The axis of shaft 10 is perpendicular to the axis of rotation of shaft 3.

Driver pulley 4 is mounted on one end of shaft 3 opposite to the other end of the shaft to which appropriate means 2 is connected. Flexible belt 6 connects driver pulley 4 to driven pulley 5 which is mounted on shaft 7 journalled in bearings 8, 8. Belt 6 and pulleys 4 and 5 defined action plane P, this plane being perpendicular to the axis of shaft 3 and parallel to the axis of shaft 10. As shown in FIG. 1, the axis of shaft 10 is located a distance L from the action plane P.

The torque acting on input shaft 1 can be resolved into a couple comprising two forces of magnitude F acting in a plane defined by the axes of shafts 3 and 7. One force passes through the axis of shaft 10 and the other passes through driver pulley 4. As shown in the drawing, these forces are spaced a distance L, so that the torque C produced by a motor driving input shaft 1 is equal to the product of the force F and the distance L. Stated otherwise, $F = C/L$. From this relationship, one can see that the force F acting to tension belt 6 is inversely proportional to the distance L with the result that the force F which provides the proper tension in belt 6 can be adjusted to any desired load supplied by pulley 5 by properly selecting the distance L. In this manner, tensioning of the belt is achieved without mechanically engaging the belt thus eliminating the problems inherent in the conventional approach for belt tensioners of the prior art.

While the preferred arrangement is to have input shaft 1 perpendicular to output shaft 3, and also parallel to the axis of pivot shaft 10, other angular relationships are possible, and indeed may provide a suitable way in which to vary the force F acting on the driver pulley which achieves the belt tensioning function.

Figure 2:
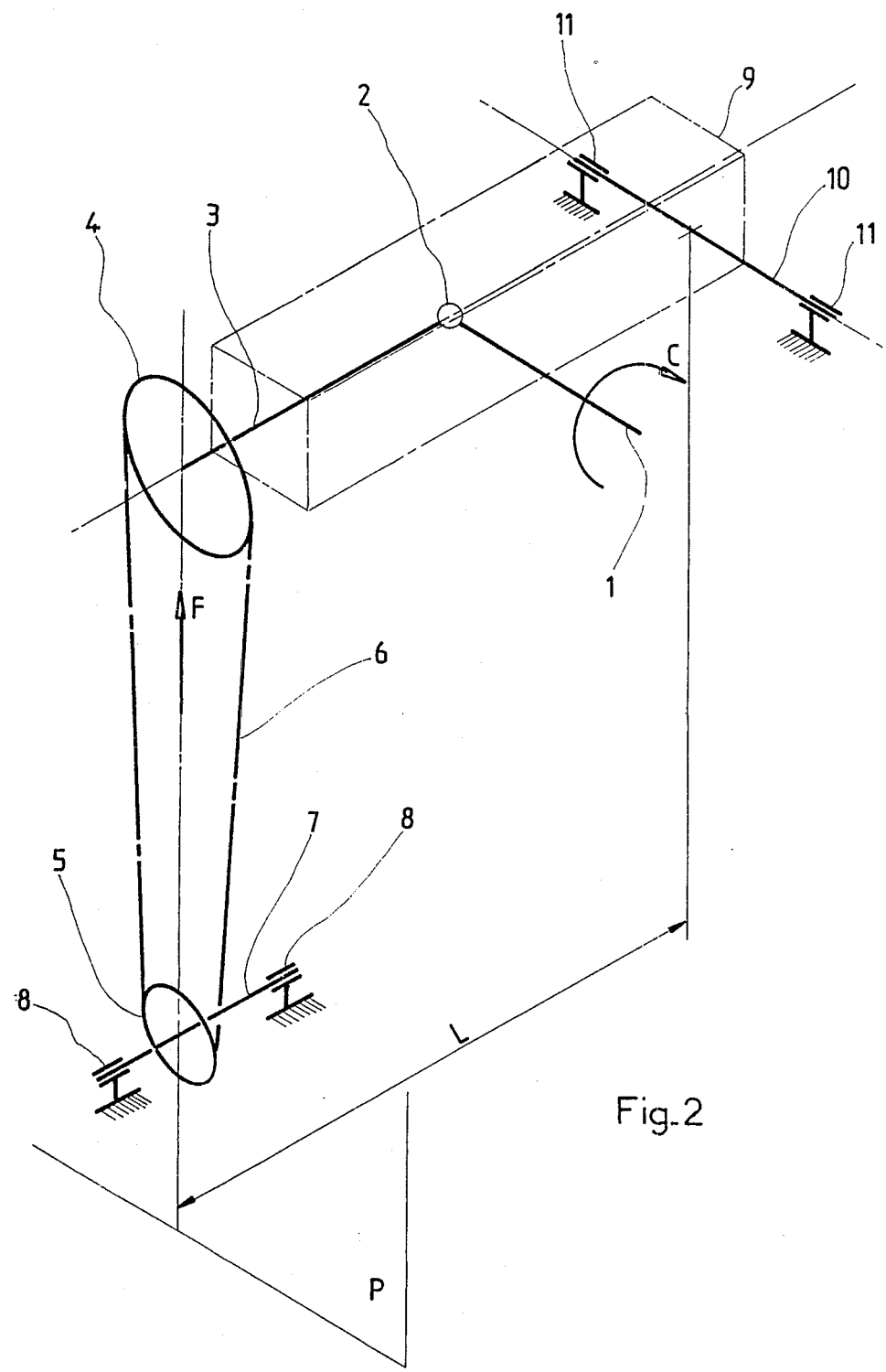
FIG. 2 is a second embodiment of the present invention wherein the input shaft lies between the pivot axis and the end of the output shaft carrying the driver pulley.

In the embodiment of FIG. 1, the pivot axis defined by the axis of shaft 10 lies between the two ends of output shaft 3. In the second embodiment of FIG. 2, on the other hand, input shaft 1 lies between the pivot axis defined by shaft 10 and the one end of output shaft 3 on which driver pulley 4 is mounted. As in the case of the first embodiment, the torque C applied to input shaft 1 can be resolved into coplanar forces F acting a distance L apart.

Figure 3:
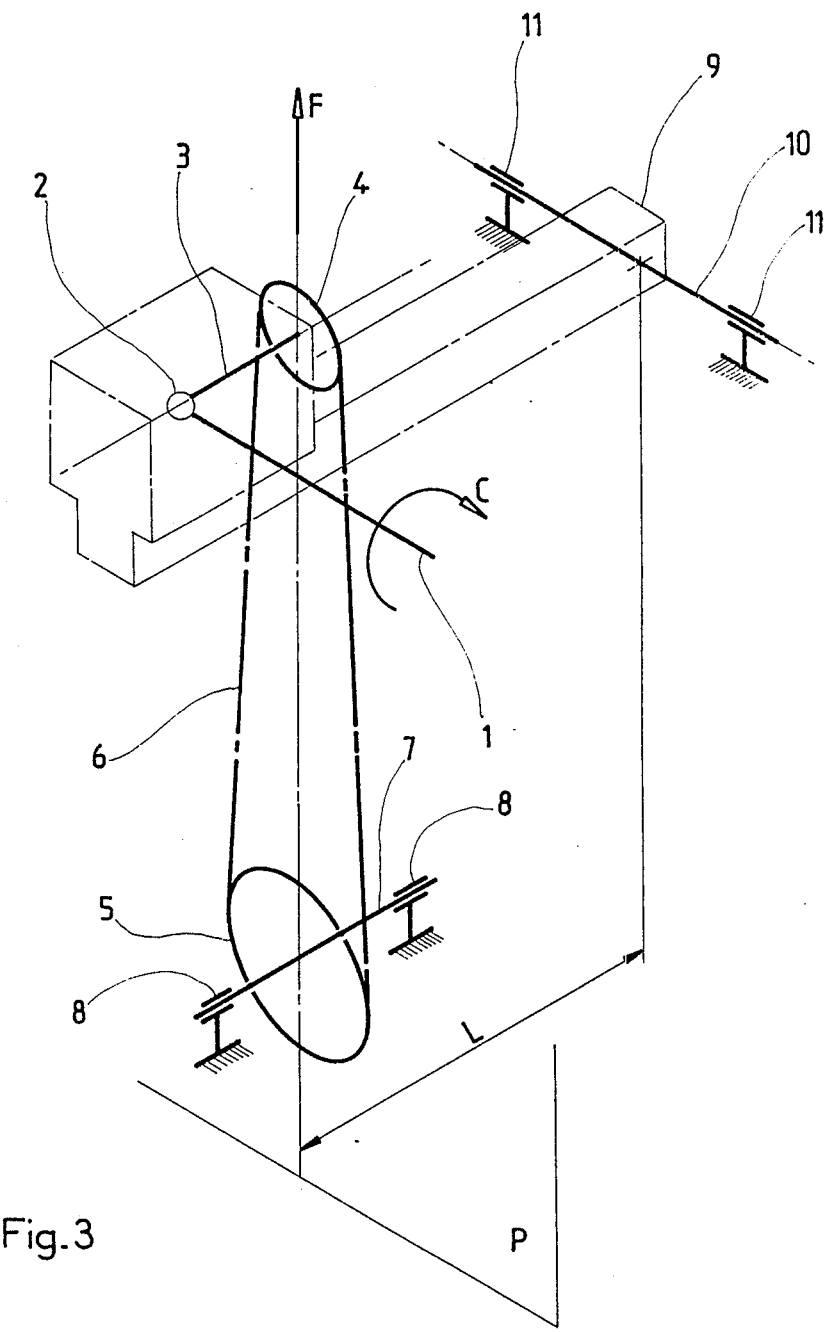
FIG. 3 is a third embodiment of the present invention wherein the end of the output shaft carrying the driver pulley lies between the input shaft and the pivot axis.

In the third embodiment of FIG. 3, the one end of output shaft 3 on which output pulley 4 is mounted lies between input shaft 1 and the pivot axis defined by shaft 10. Again, the torque C applied to input shaft 1 can be resolved into a couple defined by coplanar forces F acting a distance L apart, where L is a distance between driver pulley 4 and the axis of shaft 10.

In operation of all of the embodiments, the distance L is adjusted until the force F created by the torque applied to input shaft 1 is just sufficient to create a tension in belt 6 which is adequate to transmit the torque to driven pulley 5 without belt slippage.

The advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A transmission assembly for rotating a driver pulley connected by a belt to a driven pulley such that the two pulleys define an action plane, said assembly comprising:
   (a) a rotatable output shaft having one end adapted to be connected to said driver pulley and extending in a direction perpendicular to said action plane;
   (b) mounting means for mounting said output shaft on a pivot axis parallel to said action plane for pivotal movement in a plane perpendicular to said action plane;
   (c) a rotatable input shaft adapted to have a torque applied thereto; and
   (d) coupling means for coupling input shaft to the other end of the output shaft such that the two shafts angularly intersect.

2. A transmission assembly according to claim 1, wherein said coupling means is constructed and arranged such that the input shaft is perpendicular to the output shaft.

3. A transmission assembly according to claim 2, wherein said pivot axis lies between the two ends of the output shaft.

4. A transmission assembly according to claim 2, wherein said input shaft lies between said pivot axis and said one end of said output shaft.

5. A transmission assembly according to claim 2, wherein said one end of said output shaft lies between said input shaft and said pivotal axis.

6. A method for using a transmission assembly for rotating a driver pulley connected by a belt to a driven pulley such that the two pulleys define an action plane, wherein said assembly comprises a rotatable output shaft having one end adapted to be connected to said driver pulley and extending in a direction perpendicular to said action plane, mounting means for mounting said output shaft on a pivot axis parallel to said action plane for pivotal movement in a plane perpendicular to said action plane, a rotatable input shaft adapted to have a torque applied thereto, and coupling means for coupling the input shaft to the other end of the output shaft such that the two shafts angularly intersect, said method comprising the steps of selecting either the distance between the pivot axis and said one end of said output shaft, or the angular intersection of the shafts, in accordance with the load on said driven pulley.

* * * * *